United States Patent
Nascetti et al.

(10) Patent No.: US 7,161,154 B2
(45) Date of Patent: Jan. 9, 2007

(54) ARRAY OF SENSOR ELEMENTS

(75) Inventors: Augusto Nascetti, Aachen (DE); Michael Overdick, Langerwehe (DE); Hans-Aloys Wischmann, Henstedt-Ulzburg (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 10/542,093

(22) PCT Filed: Jan. 12, 2004

(86) PCT No.: PCT/IB2004/000031

§ 371 (c)(1),
(2), (4) Date: Jul. 13, 2005

(87) PCT Pub. No.: WO2004/064385

PCT Pub. Date: Jul. 29, 2004

(65) Prior Publication Data

US 2006/0138333 A1 Jun. 29, 2006

(30) Foreign Application Priority Data

Jan. 16, 2003 (EP) .................. 03100074

(51) Int. Cl.
*G01T 1/24* (2006.01)
(52) U.S. Cl. ............................. 250/370.09
(58) Field of Classification Search ............ 250/370.09
See application file for complete search history.

(56) References Cited

U.S. PATENT DOCUMENTS

| | | | |
|---|---|---|---|
| 4,277,799 A | 7/1981 | Koike et al. | |
| 4,891,844 A * | 1/1990 | Kiri | 382/132 |
| 4,896,216 A * | 1/1990 | Brunst et al. | 358/482 |
| 5,194,736 A | 3/1993 | Meulenbrugge | |
| 5,262,871 A | 11/1993 | Wilder et al. | |
| 5,453,611 A * | 9/1995 | Oozu et al. | 250/208.1 |
| 5,682,411 A | 10/1997 | Rushbrooke | |
| 5,841,833 A * | 11/1998 | Mazess et al. | 378/98.9 |
| 5,896,173 A | 4/1999 | Hassler | |
| 6,359,967 B1 | 3/2002 | Bielski et al. | |

FOREIGN PATENT DOCUMENTS

EP    1 089 555 A1    4/2001

* cited by examiner

Primary Examiner—David Porta
Assistant Examiner—Mark R. Gaworecki

(57) ABSTRACT

The invention relates to an array of sensor elements, wherein the sensor elements are provided to detect electromagnetic radiation such as X-radiation or light, and in doing so to generate a charge signal corresponding to the intensity of the radiation. A sensor element further comprises means enabling the incoming dose of radiation to be determined. In the array, the sensor elements form groups, so that the outputs of all sensor elements of a group are coupled. This on the one hand enables a determination of the dose in these areas, and on the other hand enables images to be formed with a lower resolution in a simple manner, by the combining of output signals from several sensor elements. Furthermore, the sensor elements of one group are preferably arranged "isolated" in such a way that they are surrounded by sensor elements of other groups. Such an array can be used, for example, in an X-ray diagnostic facility or in an optical image recording system.

17 Claims, 6 Drawing Sheets

ARRAY OF SENSOR ELEMENTS

The invention relates to an array of sensor elements, which is used for example in X-ray diagnostic systems in the formation of X-ray images. The sensor elements form groups, and are developed such that a measurement of the dose of the incident radiation is possible.

An array of sensor elements is known for example from the unexamined German application EP1089555A1. The sensor elements are arranged in columns and rows, and allocated to regions of adjacent sensor elements in such a way that the outputs of all sensor elements of one region are linked with one data line. All regions can be read in parallel, in each region each sensor element sequentially or small groups of sensor elements simultaneously being activated.

It is an object of the present invention to design an array of sensor elements that is robust in case of component failure and preferably enables a simple determination of the radiation dose.

The object is achieved with an array of sensor elements as claimed in claim 1, wherein at least one sensor element has at least one sensor, at least one output, at least one control input and at least one switch unit, wherein the sensor element can be activated, so that in the activated state a signal generated by the sensor is present at the output, wherein the switch unit is coupled to the sensor, the output and the control input, and a signal pattern present at the control input is compared with at least one activation pattern and if the present signal pattern matches the activation pattern the sensor element is activated, wherein the sensor element optionally comprises at least one means that is provided to enable a charge flow between sensor and output in the non-activated state of the sensor element, wherein the array comprises at least one group of sensor elements that is developed in such a way that at least one output from each of these sensor elements is coupled to a group output and wherein in at least one group three sensor elements form a geometric plane. Furthermore, there is in at least one group at least one sensor element that is not adjacent to any other sensor element of the group. All neighbors of this sensor element thus belong either to no group or to a different group. There is preferably at least one group of sensor elements in which no two sensor elements are adjacent to each other.

The array according to the invention is characterized by sensor elements that are provided to detect for example electromagnetic radiation, such as light or X radiation, with the help of a sensor. If such radiation strikes a sensor element, then a charge signal corresponding to the intensity of the radiation is generated in the sensor of this sensor element and can flow out of at least one output of the sensor element. An output of a sensor element is typically coupled with a signal-processing component, not described here in detail, which further processes the charge signal present at the output of the sensor element. The charge signal produced in the sensor should advantageously only be present at the output at selected times. For this purpose, a sensor element comprises a switch unit, which is coupled to the sensor, the output and a control input of the sensor element. The switch unit has the task of activating the sensor element if certain control signals or control signal patterns are present at the control input.

The sensor element further preferably comprises means of enabling a charge flow between sensor and output, in other words between the components which are coupled in the activated state. This charge flow should be possible when the sensor element is not activated, that is when the sensor is not directly coupled with the output and the charge signal is not present at the output. Such a charge flow can occur for example when radiation strikes the sensor and the charge signal builds up in the sensor. In other words: The means should enable a charge flow between sensor and output, conditioned by the build-up of the charge signal. If this charge flow is measured over a certain time with a unit that is not described in detail here, and the charge that flowed is determined from this, then the dose of the radiation that strikes the sensor of the sensor element can be determined in an extremely simple and efficient way, even while the irradiation is taking place.

The array according to the invention further comprises at least one group of sensor elements. A first feature of such a group is that at least three sensor elements of the group form a geometric plane. This means that the sensor elements belonging to a group can be localized multi-dimensionally as wished in the arrays. A second feature of at least one group is that at least one output from each sensor element of a group is coupled to a common group output, to which a unit for further processing of the charge signals of the individual sensor elements is usually connected. During a readout operation for the array, the sensor elements of a group are successively activated, for example, and the charge signals of the sensor elements of a group are thereby successively made available to the group output for further processing. This means there is no need to couple each sensor element with a separate unit for further processing of the signal. It follows from the combination of the two aforementioned features of a group that the dose of the radiation striking the sensors of all sensor elements of a group can be measured at the same time. This is advantageous, since for the accuracy of determining the total dose striking the array, it is sufficient to divide the array into areas and determine the dose from the sum of doses of the individual areas, instead of determining the total dose using the sum of the doses striking each individual sensor element.

A third feature of at least one group is the "isolated" location of at least one of its sensor elements in an environment of sensor elements of other groups. Such a location has the advantage of being more robust in the case of a breakdown or a malfunction in the components that are responsible for reading the sensor elements of a group. With such a defect, the output signal from the isolated sensor element can be interpolated with great accuracy from the output signals of the surrounding sensor elements, as the surrounding sensor elements do not belong to the same group that is affected by the defect. This gain in robustness is naturally the greater the more sensor elements of a group have a location that is isolated from one another.

It is pointed out that independent inventive significance is attached to an array which includes the optional means named above for enabling a charge flow between sensor and output, but does not implement the previously explained third group feature of the isolated location of sensor elements.

According to a preferred development of the array, its sensor elements are arranged in the form of a two-dimensional matrix, where there is at least one 2×2 block with sensor elements from four different groups. A "group" (also called a "super-pixel") should here and subsequently always be understood as a group of sensor elements whose outputs are coupled to a common group output. The four sensor elements of the 2×2 block are preferably connected with their control inputs to a common control line or to several common control lines. The array of four sensor elements of different groups in a block can thus advantageously be used to implement especially efficient running of the control lines on the array. Instead of running the control lines over large distances to corresponding sensor elements of different groups, in this array the corresponding sensor elements of the different groups are merged in a 2×2 block, so that they can be contacted there at one location by the control line(s). This wiring advantage is naturally especially great if the entire array of sensor elements consist of such 2×2 blocks with sensor elements from different groups.

According to a preferred development, the matrix-form array of sensor elements described above comprises at least one block-form (that is, formed as a submatrix) so-called "meta-group" of sensor elements, wherein the meta-group by definition consists of four different groups of sensor elements (four "super-pixels"). Furthermore, the meta-group is constructed of similar 2×2 blocks of sensor elements, wherein the four sensor elements of these blocks each belong to the four different groups. In other words, the meta-group is constructed of four different groups, which are intermixed in such a way that 2×2 mixed blocks exclusively are formed. In the overall meta-group there are thus no two sensor elements that belong to the same group and are adjacent to one another.

A preferred form for running the control lines to the sensor elements of a meta-group of the kind described above is characterized in that in the meta-group a "row" control line runs through at least each second row of sensor elements, and a "column" control line runs through at least each second column of sensor elements, wherein the sensor elements positioned on one or both sides of the control line are connected to each of the row and column control lines, and wherein each sensor element of the meta-group is connected to exactly one row control line and to exactly one column control line. In a specific development, a row control line or a column control line runs through each row and each column respectively of a meta-group.

The described array has the advantage that it is possible to address the sensor elements of the meta-group by line and row. In this context, the sensor elements are laid out in such a way that they are only activated when their row control line AND their column control line is active. With this form of addressing, k+l control lines are sufficient to allow a matrix field of k·l elements to be addressed by cell, where a "cell" can comprise one or more sensor elements in the embodiments explained above.

According to a preferred embodiment of the array previously described, row control lines are arranged only in every second row, and column control lines only in every second column. These control lines must then be connected on both sides to sensor elements, that is, each row control line activates a double row of sensor elements and each column control line activates a double column of sensor elements. This in turn means that at the intersection of an active row control line and an active column control line, four adjacent sensor elements are simultaneously activated. This does not create any conflict of uniqueness in the underlying meta-group, as the four activated sensor elements belong to a 2×2 block and thus in every case to four different groups. The outputs of the sensor elements are therefore fed to different group outputs in each case.

Another development of the array relates to the wiring of the outputs of the sensor elements of a meta-group. According to this, the outputs of the sensor elements within the meta-group are connected to internal group lines running in the row or column directions, the internal group lines themselves each being connected to one of four different external group lines, and the external group lines also running outside the meta-group in the row or column directions throughout the array. This method results in a two-level hierarchy of the readout lines with internal lines within the meta-groups and external group lines, which conduct the combined signals of the sensor elements of a group from the overall array to corresponding evaluation electronics. This wiring thus makes the best possible use of the free spaces in the rows and columns of the sensor elements for the routing.

A preferred structure of the overall array consists of m columns and n rows of similar meta-groups, where the meta-groups themselves consist of 2 n columns and 2 m rows of sensor elements, and where m and n are natural numbers. Such a layout of the array, in conjunction with the previously described running of readout lines in the form of internal and external group lines, leads to an advantageous usage of the space available for the routing. The embodiments in the description of figures are referred to for details in this context.

In a further development of the invention, a means of the sensor element is present, which in the sensor element's non-activated state enables a charge flow between sensor and output, and is formed as at least one capacitance and/or parasitic capacitance of one or more semiconductor switches. If an array according to the invention is to be manufactured with known technology, it is especially advantageous when planning the switch unit of the sensor elements, to selectively size the available parasitic capacitances of a semiconductor switch, which are normally seen as extremely disruptive, in such a way that they can be used for a sufficient charge flow. If a charge signal builds up when the sensor element is irradiated, the resulting charge flow can be seen as a displacement current. Alternatively or simultaneously, additional capacitances can be arranged, parallel to a switch for example. The use of such capacitances is explained in more detail in the embodiments.

In the array according to the invention, the radiation dose striking the array can be determined in that first the respective doses of the individual groups are established and then the total dose is calculated using the summation of these group doses.

If by their direct proximity the sensor elements of at least one group form a geometrically contiguous area, which comprises exclusively sensor elements of this group, then the array is at least partially divided into contiguous instead of fragmented areas. This is advantageous to the extent that with an allocation into contiguous areas, a simple determination of the location dependency of the dose within the overall array is possible. If all such groups further comprise the same number of sensor elements, the array is thereby (at least partially) divided into regular areas. With homogeneous irradiation of the array, all areas are irradiated with the same dose in each case. Such an allocation forms the basis for a simple, rapid and sufficiently precise determination of the dose on the overall array.

A similar effect can also be achieved by combining signals from sensor elements from a contiguous area, which come from different groups. For example, the signals of the four groups forming a meta-group can be combined to record the dose in the entire area of the meta-group at once.

If the array comprises several groups and if each group output is coupled to a separate signal-processing unit, all groups can advantageously be read out in parallel, if for example one sensor element is activated simultaneously in all groups. This can be achieved in a simple way in that the sensor elements that are to be capable of simultaneous activation have a similar activation pattern, and at least one control input of each of these sensor elements is coupled for example with a common control line. When the control line is pulsed with this activation pattern, the coupled sensor elements are activated. In the array, the control inputs of some or all sensor elements from different groups are thus preferably coupled.

According to a preferred development of the array, the control inputs of some or all sensor elements are coupled with at least one control unit, which is provided to activate the sensor elements in such a way that during the readout operation on the array, optionally none, one or several sensor elements within a group are activated at one time. The use of such a control unit enables the readout operations to be flexibly organized for the array according to the invention. If the array is used in an image-generating system, a conventional readout operation is characterized by the sequential activation and readout of all sensor elements in a group. In this, each pixel corresponds to the signal read from one sensor element. If the output image should have a lower resolution, for example, then instead of one sensor element, several adjacent sensor elements within a group can be simultaneously activated (if they exist), so that a combination signal formed from the signals present at the outputs of the individual activated sensor elements is present at the group output. This combination signal can then be immediately assigned to a pixel of the output image. It is not necessary to read out every sensor element of the array and, in a post-connected data processing unit, determine a pixel from the individual signals of the respective sensor elements. Since the combination signal is formed by direct averaging of the individual signals, a further resulting advantage is lower noise. However, if the averaging is to be over areas in which the sensor elements belong to different groups, then their signals must be combined in the readout unit. For example, by combining the four group outputs of a meta-group, a 2×2 binning can be executed within the meta-group, without the need to change the control of the activation lines for this. It is further possible to activate no sensor element at all from a group during a readout operation, if for example the signal from this sensor element is not needed for the formation of the output image.

A readout amplifier is preferably coupled to each group output. During a readout operation on the array, it is then possible to simultaneously amplify the signals present at the respective group outputs, and prepare them for further processing.

If the readout amplifier is provided in a further function to determine the charge flow over a certain time using means of the sensor element which enable a charge flow between sensor and output in the non-activated state of the sensor element, then the readout amplifier can be used to determine the radiation dose striking the respective group, from the charge flow. In this way, the dose can be determined for each of the groups simultaneously and thus for the entire array. This determination of the dose can take place during irradiation.

The array preferably comprises a monitoring unit, which is provided to determine the dose striking the entire array or parts of the array during an irradiation, and to provide a warning signal when a certain dose is reached. The supplied signal can advantageously be used to stop the irradiation of the array after a maximum radiation dose is reached. This can be done by influencing the radiation source itself, for example, or by means incorporated in the path of rays. Furthermore, the dose measured during the irradiation can also be used to control parameters of the X ray tube, for example the tube current and/or voltage. This is dealt with in more detail in the description of the embodiments.

Claims 9 and 10 describe respectively an X-ray investigation system and an optical image recording system, in which an array as in claim 1 is included.

The invention will be further described with reference to examples of embodiments shown in the drawings to which, however, the invention is not restricted.

Figure 1:
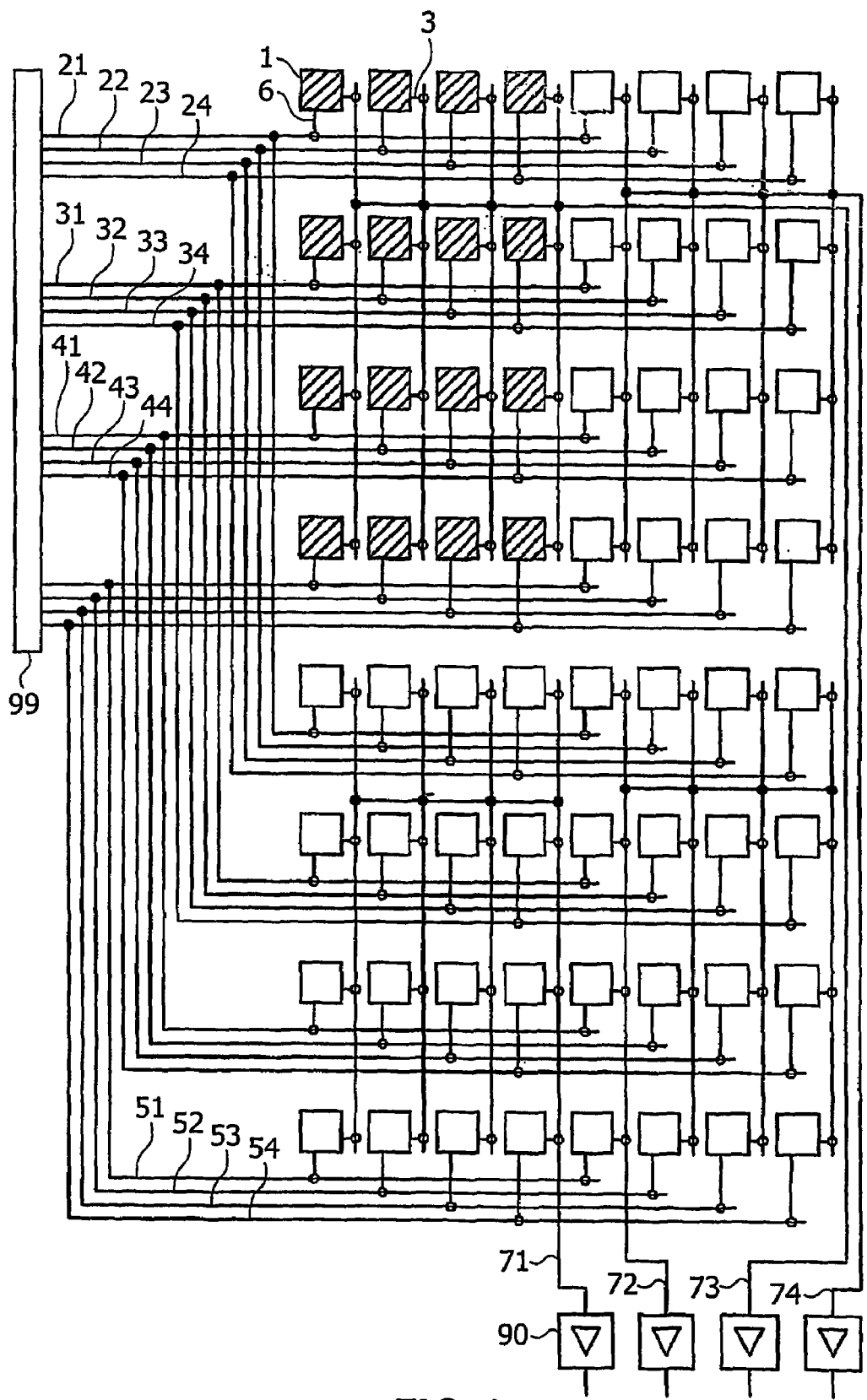
FIG. 1 shows a detail of an example for an array of sensor elements in groups.

FIG. 1 shows a detail of an implementation, on which the invention is based, for an array of sensor elements. The sensor elements 1 are arranged in a matrix of rows and columns. Each sensor element 1 comprises both a control input 6, via which the sensor element 1 can be activated, and also an output 3, through which in the activated state the charge signal produced in the sensor of the sensor element 1 can flow. Each 16 sensor elements 1, which are arranged in a submatrix of four rows and four columns, form a group, four of which are shown in FIG. 1. The sensor elements 1 of one of these four groups are shown shaded for greater clarity. The outputs 3 of the sensor elements 1 of a group are each coupled to a common group readout line 71, 72, 73 and 74, and each group readout line 71, 72, 73 and 74 is linked to a readout amplifier, for example 90. The control input 6 of a sensor element 1 of a group is linked with the respective control input 6 of a sensor element 1 of another group via a common control line 21, 22, 23, 24, 31, 32, . . . , 53, 54 and each common control line 21, 22, 23, 24, 31, 32, . . . , 53, 54 is linked to a control unit 99.

If the control lines are individually sequentially pulsed with an activation signal by the control unit 99, for example in the order 21, 22, 23, 24, 31, 32 . . . 53, 54, then all sensor elements 1 of a group are successively activated and the charge signals of all sensor elements 1 of a group successively reach the respective readout amplifier over the respective group readout line 71, 72, 73 and 74. This happens simultaneously in all groups, the groups thus being read out in parallel. An output image formed from this can have the maximum possible resolution.

In an image creation system, images are often needed which have a lower number of pixels than the maximum that can be supplied by the array of sensor elements, i.e. whose resolution is lower than the maximum possible. With full resolution, each pixel corresponds to the charge signal of a sensor element, and with a reduced resolution the number of pixels is lower than the number of sensor elements. This reduced resolution is generally achieved by reading out all sensor elements of the array and in a processing unit, not shown here, forming a pixel from the combination of the individual charge signals of several sensor elements. This method is called binning. For example, if the array consists of 1000 rows and 1000 columns and a binned image consists of 500 rows and 500 columns, then a pixel is formed, for example, from the charge signals of four adjacent sensor elements, respectively two in the same row and two in the same column. In spite of the lower image resolution, the volume of data transferred from the array to the processing unit remains the same as for fall resolution of the image. However, in the array according to the invention, a direct binning is possible, even before the signals reach the readout amplifier. The thereby reduced volume of data allows a higher image sequence with successive images for the same data flow, at the same time reducing the noise in the combined signal.

The output image should for example have half as many pixels in the rows and columns respectively as the array comprises sensor elements in rows and columns. If the common control lines 21, 22, 31 and 32 in FIG. 1 are now simultaneously pulsed with an activation signal by the control unit 99, then in each group four directly multidimensionally adjacent sensor elements 1 are simultaneously activated, whose output signals are overlaid on the respective group readout lines 71, 72, 73 and 74. A combination signal formed from four output signals is thus present at the respective readout amplifier; it represents a binned output signal and can be directly assigned to a pixel in the output image. Further pixels are created for example from the binned signal of the sensor elements which are activated when the control lines 23, 24, 33, 34
41, 42, 51, 52
43, 44, 53, 54 are pulsed. If the resolution of the image is to be reduced still further, all sixteen sensor elements 1 of a group can be simultaneously activated. The array according to FIG. 1 accordingly offers the possibility of a two-level binning. If more than sixteen sensor elements form a group in a larger array, for example 1024, 128 each per row and column, then a multi-level binning is possible, for example, in such a way that in a first level respectively four sensor elements per group are simultaneous activated, in a second level 16 sensor elements per group, in a third level 64, and so on.

In practice, in extended arrays of the kind described, far more sensor elements form a group than are shown in FIG. 1.

Furthermore, such an array of sensor elements allows the dose of the incoming radiation to be measured in a spatially multidimensional field. According to FIG. 1, the area formed by the sensor elements 1 of a group is two-dimensional and rectangular, so that the area forms a plane. During the irradiation, a charge flow characterizing the intensity of the radiation flows over each sensor element 1, and accumulated from all sensor elements 1 of a group it reaches the readout amplifier over the common group readout line 71, 72, 73 or 74 respectively. The readout amplifier is provided, as well as for the actual amplification of the readout signal, to measure this charge flow. Using the integrated charge flow over a certain period, the radiation dose striking the plane of all sensor elements of a group can then be derived.

The described array offers the possibility of optimizing the size and shape of the surface that is formed by the sensor elements of a group, in relation to dose measurement. It is also possible to organize the shape of the surface differently for some groups or every group, for example in order to treat the edges of an array separately from the central area. It is also feasible for the surfaces of the individual sensor elements in groups that are positioned on the edge of the array to be made larger than for sensor elements of a group in the central area of the array, in the way the light sensors in the human eye are arranged.

Figure 2:
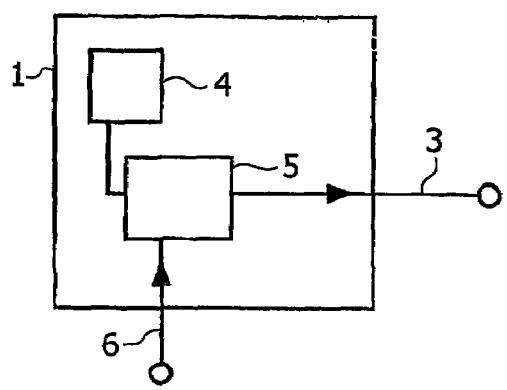
FIG. 2 shows a general sensor element.

The necessary measurement of the charge flow for determining the dose can be enabled by certain features of the switch unit of any sensor element. A general embodiment of a sensor element 1 is first shown in FIG. 2. The sensor element 1 comprises a sensor 4, which generates a charge signal when struck by electromagnetic radiation, for example light or X radiation. The sensor element 1 further comprises an output 3, over which the charge signal can flow for further processing. To enable the flow of the charge signal to be controllable, the sensor element 1 has a switch unit 5, which is provided to activate the sensor element 1 when an activation signal is present at the control input 6. An activated sensor element 1 is characterized in that the sensor 4 is coupled with the output 3.

Figure 3:
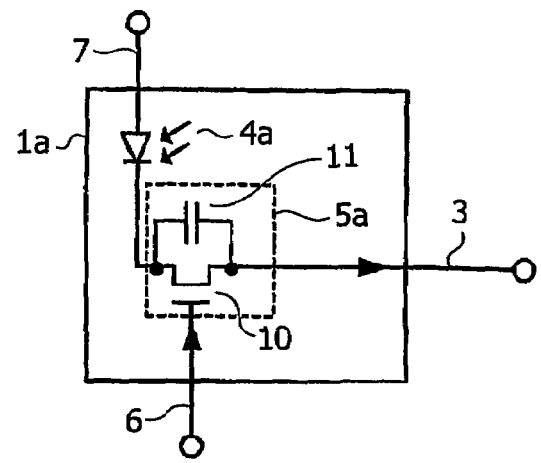
FIG. 3 shows a sensor element with a photodiode as sensor.

FIG. 3 represents a preferred embodiment of a sensor element 1a, which can additionally be used for dose measurement. The sensor 4a consists of a photodiode 4a, which is fed via a supply input 7 and when struck by light generates a charge signal, which is stored in the internal capacitances of photodiode 4a. The switch unit 5a is implemented with a semiconductor switch 10, which has a capacitance 11 in parallel to the breaker gap. The supply input 7 and the output 3 are linked into a circuit through the readout amplifier, not shown here, coupled to output 3. While sensor element 1a is not activated, the semiconductor switch 10 is open and the radiation to be detected, in this case light, strikes the photodiode 4a. The build-up of the charge signal in the internal capacitances of photodiode 4a leads to a charge flow, which can flow out from the photodiode 4a through the capacitances 11 to the output 3 and on to the readout amplifier, not shown here. From the quantity of the charge that flowed, it is possible to determine the dose that struck the photodiode 4a, even while an irradiation is taking place. To measure the actual charge signal, in a next step the sensor element 1a is activated by pulsing of the control input 6 with an activation signal, the semiconductor switch 10 then being closed and the photodiode 4a thus being coupled with output 3. The charge signal present on the photodiode 4a can flow almost completely into the readout amplifier. When the semiconductor switch 10 is subsequently opened, the sensor element 1a is deactivated again and the sensor element 1a is ready for a further measurement if X radiation should be detected with such a sensor element 1a, then a so-called scintillator is arranged before the photodiode 4a. This scintillator is provided to emit light when struck by X radiation.

Figure 4:
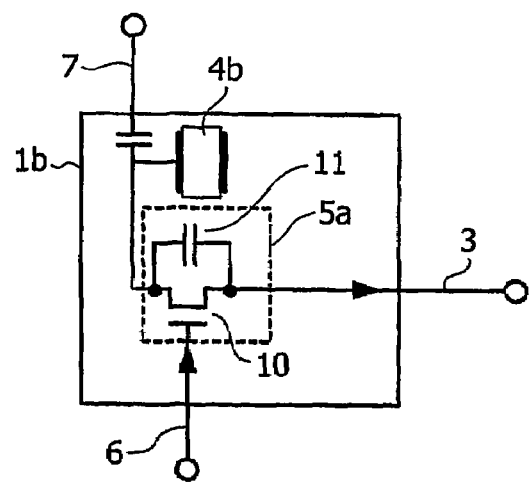
FIG. 4 shows a directly converting sensor element.

FIG. 4 shows another preferred embodiment of a sensor element 1b, which can be used in the array according to the invention. In contrast to the embodiment just described, the sensor is directly converting and is formed by a layer 4b between two electrodes, the layer material being provided to react to incoming X radiation by changing a voltage present at the electrodes. The layer material can consist of amorphous selenium, lead iodide, lead oxide or mercuric iodide. The voltage change causes a charge flow over the capacitance 11, which is switched in parallel to the semiconductor switch 10. The dose of radiation and the charge signal of sensor 4b can be determined and read using the methods and means described above for FIG. 3. The connection of sensor 4b's second electrode, which is usually implemented as a common electrode of all sensors in the array, is not shown here.

Figure 5:
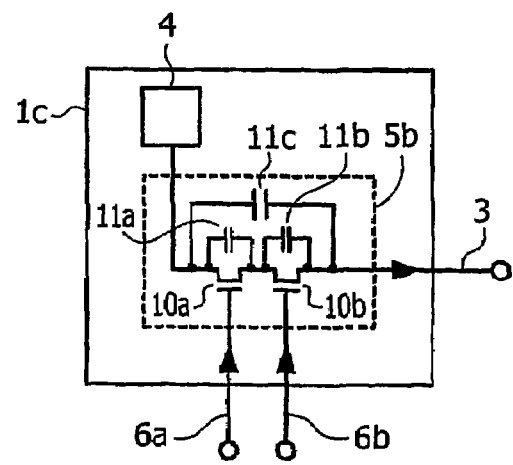
FIG. 5 shows a sensor element with two control inputs.

FIG. 5 shows an example of embodiment of a sensor element that comprises more than one control input. The switch unit 5b of a sensor element 1c comprises two series-connected switches 10a and 10b, where the switch inputs of the switches 10a and 10b form a first control input 6a and a second control input 6b of the sensor element 1c. To each of the switches 10a and 10b a capacitance, respectively 11a and 11b, is switched in parallel. A further optional capacitance 11c, which is switched in parallel to the total breaker gap of the switch unit 5b, shows an example of the diverse layout possibilities for optimal adjustment to a signal-processing system. By means of the capacitances 11a, 11b and 11c, the previously described dose measurement is possible in a similar way. As a result of the development of two control inputs 6a and 6b per sensor element, the activation patterns can be considerably more complex than when the sensor elements are developed with only one control input. The resulting advantage becomes clear when the number of control lines per group is considered. For an example of this, the following assumptions are made: A control input can be pulsed with two different signals, '0' and '1'. If a sensor element has one control input, suppose it is activated when the signal '1' is present at this control input, and if a sensor element has two control inputs, suppose it is only activated when the signal '1' is present simultaneously at both control inputs. Under these conditions, in an array with respectively one control input per sensor element of a group, it is necessary, as FIG. 1 makes clear, to feed a control line respectively for each of these sensor elements. The number of control lines to which the sensor elements of a group are coupled is as great as the number of its sensor elements. However, if the sensor elements have two control inputs, it is possible with clever coupling of the control inputs to the control lines, to considerably reduce the total number of control lines that must be fed to a group. Suppose the number of sensor elements per group is N, and the number of control lines fed to the group is L. With one control input per sensor element, L=N control lines are needed per group, while with two control inputs per sensor element, at least $L=2 \cdot \sqrt{N}$ control lines per group are necessary, where L must be rounded up to the next whole number. The greater the number of sensor elements per group, the clearer this effect is.

The sensor elements shown as examples in FIGS. 2 to 5, can be manufactured with known technology, for example in thin-film electronics with transistors and possibly photodiodes of amorphous silicon. The further elements needed according to the invention to enable the charge flow can also be implemented in the mentioned thin-film technology.

Figure 6:
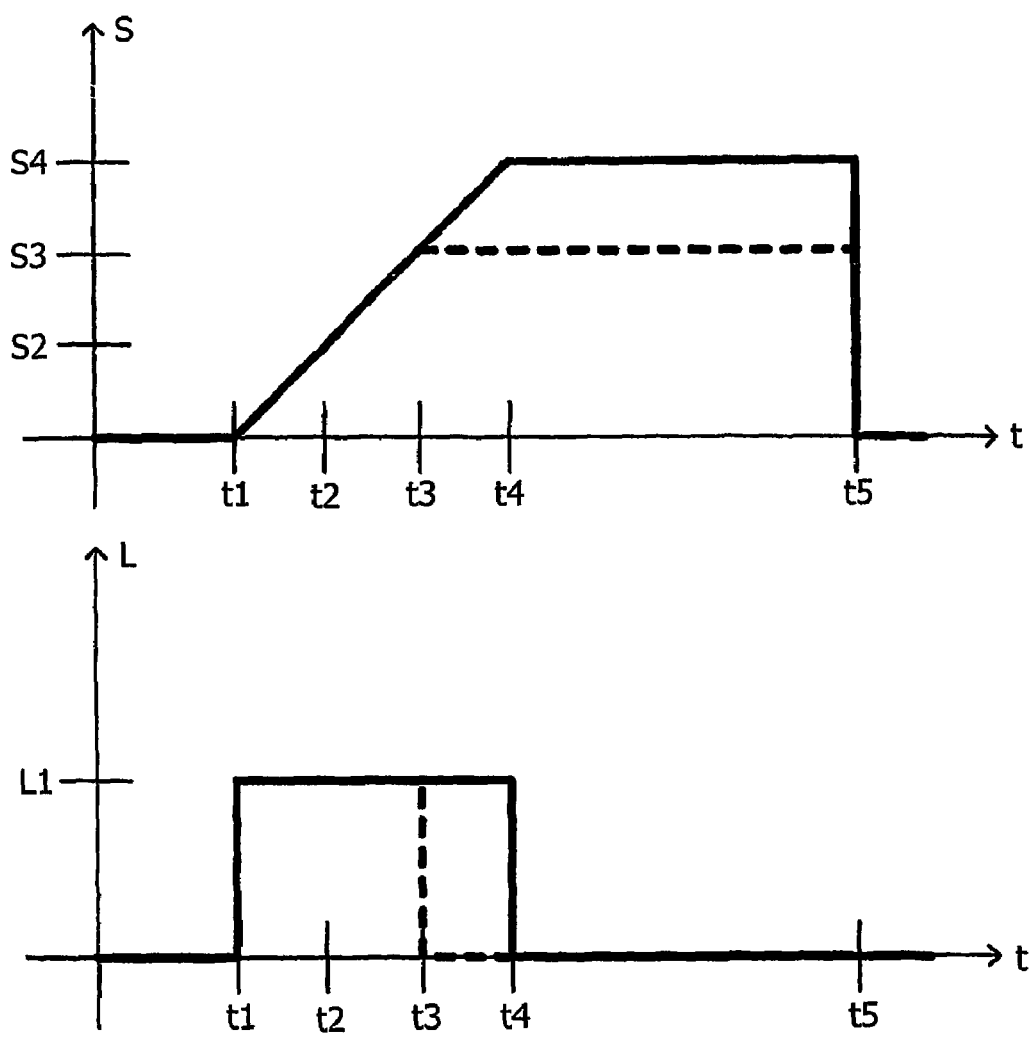
FIG. 6 shows two diagrams of the time characteristics of the charge signal and of the charge flow.

FIG. 6 shows a diagram in which an example of the time characteristics of the charge signal and of the charge flow in a sensor element are represented. The vertical axis in the upper diagram represents the value of the charge signal S, the vertical axis in the lower diagram the value of the charge flow L, and the horizontal axis the time t in each case. Up to a time t1 there is no charge signal present in the sensor and the sensor element is not irradiated. The continuous curve characteristics are considered first. From the time t1 the sensor element is irradiated with an emission whose intensity is approximately constant in time, causing the charge signal to increase approximately linearly. At a time t4 the charge signal has reached the value S4 and the irradiation is ended. At a time t5 the sensor element is activated and the charge signal can flow from the sensor element for further processing. While the charge signal increases in the period between t1 and t4, an approximately constant charge flow L1 is enabled through the corresponding means of the switch unit, as shown in the lower diagram.

The dose can be determined from the quantity of the charge that flowed. If the quantity of charge that has already flowed is determined during the irradiation at further times t2 and t3, then the dose that has already struck the sensor element can be determined even during irradiation. If it is essential that a certain dose is not exceeded, and if this maximum permitted dose is already reached at a time t3, then this information can be used to stop further irradiation, by means of a warning signal that indicates this excess and is routed to an X-ray source, for example. The broken curve characteristics then appear in both the upper and the lower diagram. Another method for evaluating the dose during irradiation consists of determining the charge flow at regular intervals and using suitable algorithms to forecast the time when the maximum permitted dose will be reached. The irradiation is then stopped at this time.

In the array shown in FIG. 1, in which the sensor elements of a group form a contiguous block, the failure of a readout line 71, 72, 73 or 74 or readout device 90 assigned to such a group can lead to defects that extend over the entire area of the group and therefore cannot be corrected. Furthermore very many readout lines must be run in each area, so that the routing of the lines becomes very complex.

Figure 7:
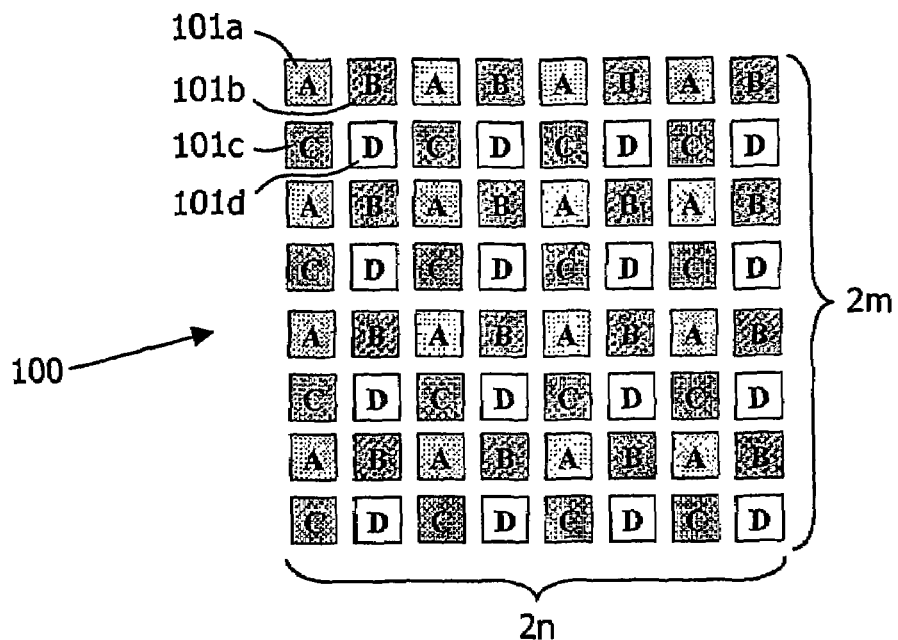
FIG. 7 shows a meta-group of four intermixed groups of sensor elements.

To reduce this problem, a modified array shown schematically in FIG. 7 is suggested according to the invention. FIG. 7 shows a block-shaped detail 100 from the overall array of sensor elements, this detail subsequently being referred to as a meta-group (or meta-pixel). The meta-group 100 consists of sensor elements 101a, 101b, 101c, 101d from four different groups, the sensor elements that belong to one group (so-called super-pixel) being indicated in the figure by a similar texture as well as by a group letter, A, B, C or D respectively. As a result of the intermixed array of the groups, the meta-group 100 is made up of (in the example sixteen) 2×2 blocks, each of these 2×2 blocks consisting of four sensor elements 101a–101d, which belong respectively to the different groups A, B, C, D. This method creates a structure in which each sensor element of a group A, B, C or D is surrounded by eight sensor elements from the other groups. Thus if there is a failure in the readout electronics of a group (for example B), the consequently missing pixel in the image can be interpolated with good accuracy by the surrounding pixels (of the groups A, C, D). An array of this kind is therefore very robust against defects.

As was explained in the context of FIGS. 1 to 6, the described array also enables recording of the dose during the exposure without additional components using leakage currents and parasitic capacitances of the readout TFTs (see also EP 486 102 B1, although without the serious disadvantages because of the restriction to column information).

While a quadratic layout of the meta-group 100 with 2 m rows and 2 n columns of sensor elements is shown in FIG. 7 for m=n ∈N, more general rectangular forms with m≠n are also possible.

The wiring of the sensor elements in the array of FIG. 7 can in principle be as in FIG. 1 by assignment of exactly one control line to each of four corresponding sensor elements 101a–101d of the four different groups. But a routing of this kind is simplified in the array of FIG. 7 by the fact that the control lines meet the sensor elements to be connected to them, not distributed over a large area but in a compact 2×2 block.

Figure 8:
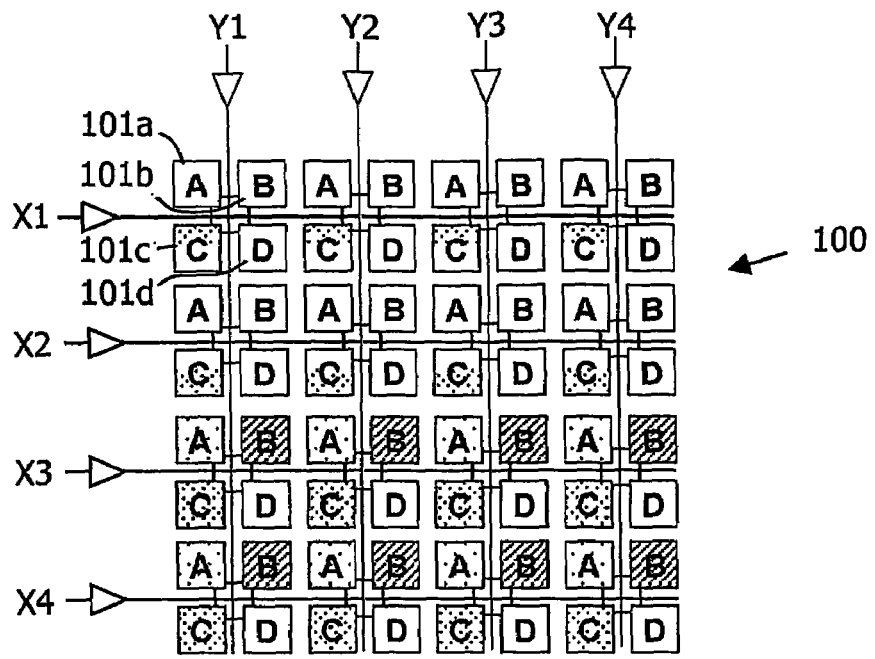
FIG. 8 shows the running of control lines through double rows and double columns in a first implementation form of the meta-group from FIG. 7.

The addressing of the sensor elements in a meta-group 100 is preferably by rows and columns, to simplify the routing still further. A first embodiment is shown in this context in FIGS. 8 and 9, where FIG. 8 shows the running of the control lines (or activation lines) and FIG. 9 the running of the readout lines. According to FIG. 8, row control lines X1, X2, X3 and X4 are run through every second row between the sensor elements, and column control lines Y1, Y2, Y3 and Y4 through every second column between the sensor elements, with all sensor elements below and above each row control line being connected to it, and all sensor elements to the left and right of each column control line being connected to this. The activation of a control line Xi thus affects a double row of sensor elements, and the activation of a column control line Y1 a double column of sensor elements. As the sensor elements according to FIG. 5 are internally linked by an AND conjunction to the row and column control lines, a sensor element is activated precisely when both its row control line and its column control line are active. This in turn means that in the array shown in FIG. 8, when a row control line and a column control line are active, four sensor elements around the intersection point of the control lines are activated. For example, the four sensor elements 101*a*–101*d* are activated when the control lines X1 and Y1 are active. However, this activation of adjacent sensor elements does not lead to any conflicts, as from the construction these belong to different groups and are therefore read on different readout lines.

Figure 9:
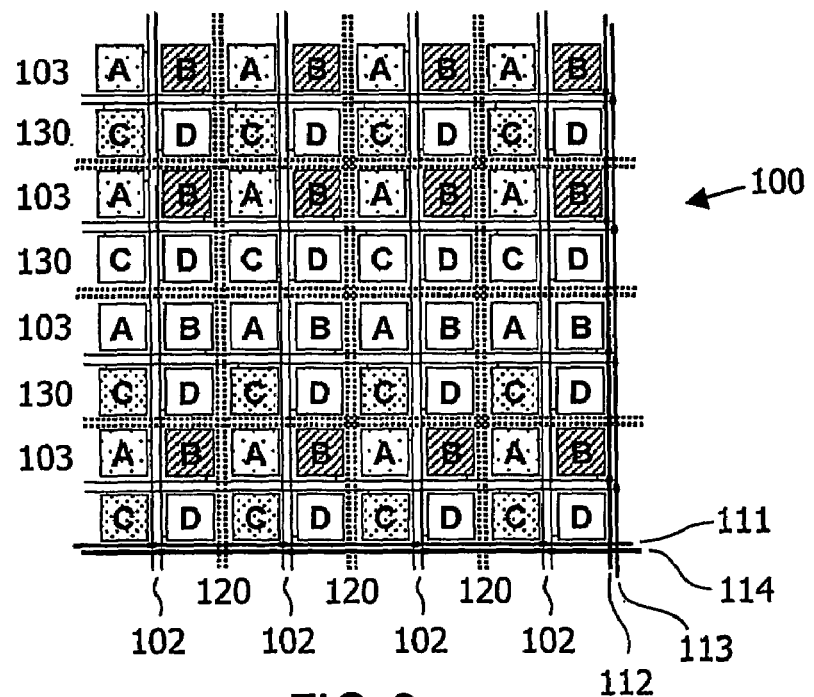
FIG. 9 shows the running of readout lines belonging to FIG. 8.

FIG. 9 shows the running of the readout lines in the meta-group 100 of FIG. 8. It can be seen that within the meta-group, internal readout lines 102 run through the columns of the meta-group 100, and 103 through the rows, with only sensor elements belonging respectively to one of the groups A, B, C or D being connected to any readout line. All readout lines of a group are here connected at the edge of the meta-group 100 to external readout lines 111 (for group A), 112 (for group B), 113 (for group C) and 114 (for group D), with the external readout lines running to the edge of the overall array or chip and ending in corresponding readout devices, in a fashion not further represented here. In their path over the sensor area, the external readout lines 111–114 necessarily cross the rows and/or columns of other meta-groups. This can be seen from FIG. 9 for the external readout lines 120, 130 of other meta-groups (not shown). It can also be seen that the running of the internal readout lines 102 and 103 just in each second row or column leaves space for such external readout lines to go through.

In summary, the embodiment shown in FIGS. 8 and 9 has the following topology:
Activation lines: In every second row or column
  one X activation line for two rows in a meta-group;
  one Y activation line for two columns in a meta-group.
Readout lines: Alternately by row or column
  two internal readout lines between adjacent sensor elements;
  two external readout lines between adjacent sensor elements.

Altogether, alternately three lines (two internal readout lines plus one activation line) or two lines (two external readout line) always run between two adjacent sensor elements in each direction (X and Y).

The advantage of this implementation is that a lower number of lines is needed, which simplifies the construction of the total array.

Figure 10:
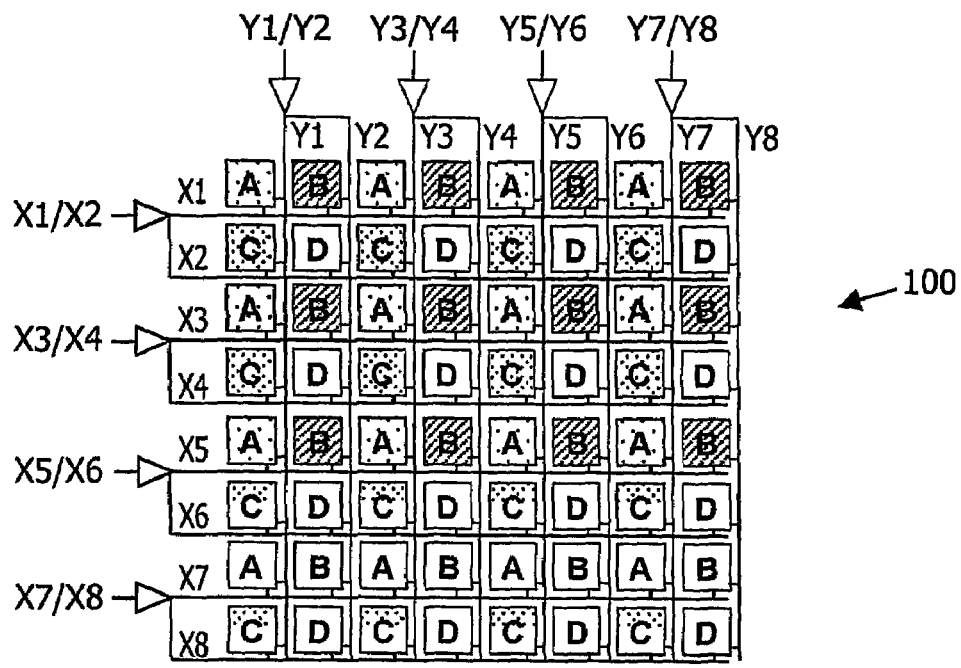
FIG. 10 shows the running of control lines through each row and column in a second implementation form of the meta-group from FIG. 7.
Figure 11:
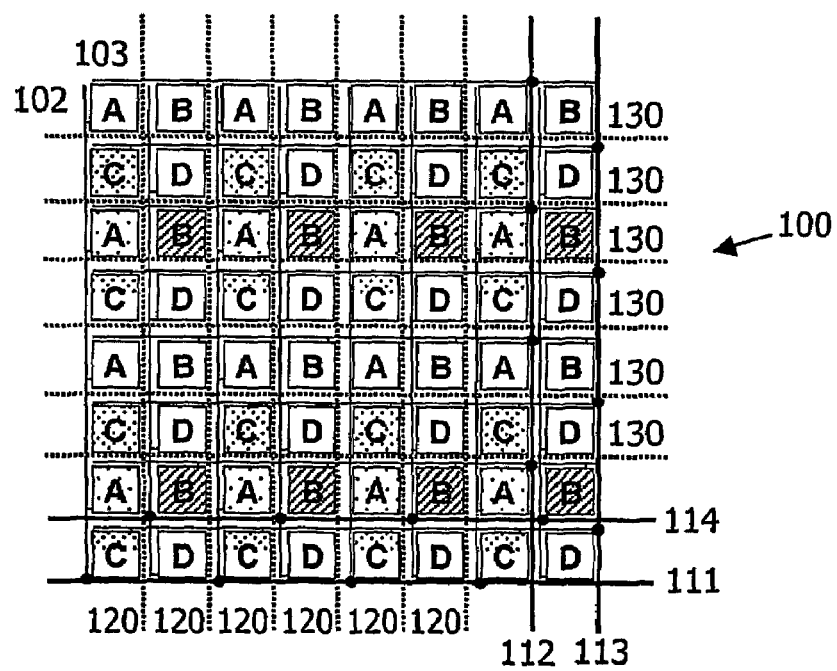
FIG. 11 shows the running of the readout lines belonging to FIG. 10.

FIGS. 10 and 11 show an alternative wiring possibility for the meta-group 100. FIG. 10 shows the running of the activation lines, with an activation line X1-X8 or Y1-Y8, to which the sensor elements above or to the left respectively are connected, running through every row and every column respectively between the sensor elements. The control lines X1/X2, X3/X4, . . . Y7/Y8 are combined in each case, i.e. pulsed with the same signals.

FIG. 11 shows the associated running of the readout lines. Exactly one internal readout line 102 or 103 and one external readout line 111–114 (from the same meta-group 100) or 120, 130 (from other meta-groups) is run through each row and each column.

In summary, the embodiment shown in FIGS. 10 and 11 has the following topology:
Activation lines:
  One X activation line for one row of the meta-group;
  One Y activation line for one column of the meta-group;
Readout lines:
  One internal readout line between adjacent sensor elements;
  One external readout line between adjacent sensor elements.

Altogether there are then three lines between adjacent sensor elements (one external and one internal readout line, and an activation line) in each direction (X and Y).

Figure 12:
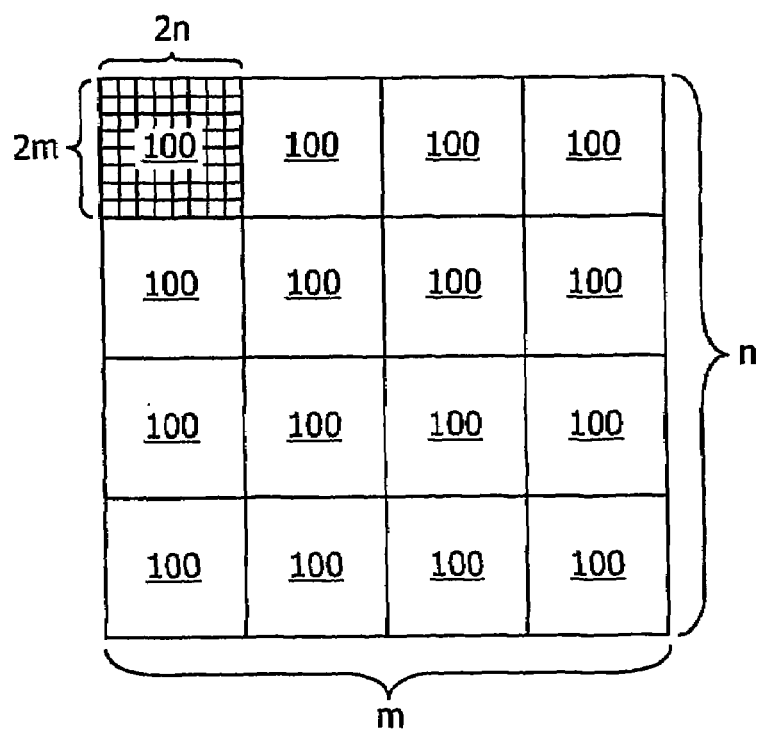
FIG. 12 shows the structure of the overall array of meta-groups according to the invention.

FIG. 12 shows a possible overall layout of an array of sixteen meta-groups 100. An array compatible with the routings of FIGS. 8 to 11 provides in this case that n rows of meta-groups 100 are arranged in m columns, each meta-group comprising 2 m×2 n sensor elements as explained above. Such a sizing ensures that there is sufficient space for running the external lines in the rows and columns between the sensor elements.

For the special case m=n, this gives the following ratios between the overall array, a meta-group 100 and a group:
  n×n it sensor elements per group;
  four groups per meta-group;
  n×n meta-groups per array;
  4 $n^4$ sensor elements per array;
  1 readout channel per group;
  4 $n^2$ readout channels per array;
  $n^2$ pixels per readout channel;
  For example, n=32 gives: 2 k×2 k pixels per array and 1 k pixels per readout channel.

With flat dynamic X-ray detectors (FDXD), the described array of sensor elements can be implemented in principle with the same technology as before. The only essential difference is in the routing of the activation and readout lines.

The advantages of the invention can be seen in that a higher fault tolerance is achieved in operation, and possibly also in the manufacture of the detector, as the image can be corrected for a defective sensor element group, because for each defective pixel eight non-defective neighbors can be used. Further advantages are:

Operation with dose recording during the exposure is possible without additional internal or external components.

Increase of image frequency by shortening of readout time: As the number of readout amplifiers is increased compared to conventional arrays, data can be read more rapidly overall from the pixels.

Reduced noise: For the same reasons, the (so-called uncorrelated) noise is also reduced by the smaller capacitive load of the amplifiers.

Avoidance of row-correlated noise: In conventional FDXD, effects in the readout electronics lead to so-called row-correlated noise, which has a disruptive effect because it is clearly visible. In comparison, the visibility of the effects with the suggested readout topology is severely suppressed, since the "pixels of the same phase" are no longer arranged in rows.

Realization of particularly fast zoom modes: By suitable array of the pixel clusters, precisely the desired subareas of a detector can be read out. But the pixel clusters not in the zoom area are also controlled as normal, so that image artifacts after the switch to fullscreeen mode are avoided.

The invention claimed is:

1. An array with sensor elements arranged in the form of a two-dimensional matrix including at least one sensor element having a sensor, at least one output, at least one control input and at least one switch unit, the sensor element being configured so that in an activated state a signal generated by the sensor is present at the output, wherein a switch unit for activating the sensor element according to signals present at the control input is connected to sensor, the output and the control imput, wherein the array further has at least one group of sensor elements configured so that at least one output from each sensor element is connected to a group output, and wherein in at least one group three sensor elements form a geometric plane and there exists in at least one group at least one sensor element that is not adjacent to any other sensor element of the group, and wherein the addressing of the sensor elements of each group can selectively be changed between individual and simultaneous addressing, wherein there is at least one 2×2 block with sensor elements from four different groups, wherein the array further has at least one block-form meta-group having four groups of sensor elements forming similar 2×2 blocks with sensor elements from each of the four groups such that in the meta-group a row control line runs through at least each second row of sensor elements and a column contol line runs through at least each second column of sensor elements, wherein the sensor elements positioned on one or both sides of each of the control lines are connected to it, and wherein each sensor element of the meta-group is connected to exactly one row control line and to exactly one column control line.

2. An array as claimed in claim 1, wherein the four sensor elements of the 2×2 block are connected with their control inputs to common control lines.

3. An array as claimed in claim 1, wherein the outputs of the sensor elements within the meta-group are connected to internal group lines running in the row or column direction, these group lines themselves being connected to four external group lines running through the array outside the meta-group in the row or column direction.

4. An array as claimed in claim 1, wherein the array consists of m columns and n lines of similar meta-groups, the meta-groups themselves consisting of 2n columns and 2m lines of sensor elements.

5. An array as claimed in claim 1, wherein a means of the sensor element is at least one capacitance and/or parasitic capacitance of one or more semiconductor switches.

6. An X-ray investigation system, wherein at least one array as in claim 1 is included in the X-ray investigation system.

7. An optical image recording system, wherein at least one array as in claim 1 is included in the optical image recording system.

8. An array with sensor elements including at least one sensor element having a sensor, at least one output, at least one control input and at least one switch unit, the sensor element being configured so that in an activated state a signal generated by the sensor is present at the output, wherein a switch unit for activating the sensor element according to signals present at the control input is connected to the sensor, the output and the control input, wherein the sensor element further has means for enabling a charge flow between sensor and output in the non-activated state of the sensor element, at least one group of sensor elements configured so that at least one output from each sensor element is connected to a group output, wherein in at least one group three sensor elements form a geometric plane and there exists in at least one group at least one sensor element that is not adjacent to any other sensor element of the group, and wherein the addressing of the sensor elements of each group can selectively be changed between individual and simultaneous addressing.

9. An array as claimed in claim 8, characterized in that the sensor elements are arranged in the form of a two-dimensional matrix, wherein there is at least one 2×2 block with sensor elements from four different groups.

10. An array as claimed in claim 9, wherein the four sensor elements of the 2×2 block are connected with their control inputs to common control lines.

11. An array as claimed in claim 9, wherein the array comprises at least one block-form meta-group of sensor elements, wherein the meta-group consists of four groups of sensor elements and is constructed of similar 2×2 blocks with sensor elements from each of the four groups.

12. An array as claimed in claim 11, wherein in the meta-group a row control line runs through at least each second row of sensor elements, and a column control line runs through at least each second column of sensor elements, wherein the sensor elements positioned on one or both sides of each of the control lines are connected to it, and wherein each sensor element of the meta-group is connected to exactly one row control line and to exactly one column control line.

13. An array as claimed in claim 11, wherein the outputs of the sensor elements within the meta-group are connected to internal group lines running in the row or column direction, these group lines themselves being connected to four external group lines running through the array outside the meta-group in the row or column direction.

14. An array as claimed in claim 11, wherein the array consists of m columns and n lines of similar meta-groups, the meta-groups themselves consisting of 2n columns and 2m lines of sensor elements.

15. An array as claimed in claim 8, wherein a means of the sensor element is at least one capacitance and/or parasitic capacitance of one or more semiconductor switches.

16. An X-ray investigation system, wherein at least one array as in claim 8 is included in the X-ray investigation system.

17. An optical image recording system, wherein at least one array as in claim 8 is included in the optical image recording system.

* * * * *